United States Patent [19]

Doss

[11] Patent Number: 5,123,595
[45] Date of Patent: Jun. 23, 1992

[54] METHOD AND APPARATUS FOR HEATING AND VENTILATING A POULTRY HOUSE

[76] Inventor: James R. Doss, 2909 Shelton Rd., Fayetteville, Ark. 72703

[21] Appl. No.: 500,927

[22] Filed: Mar. 29, 1990

[51] Int. Cl.⁵ .................................................. F24F 7/00
[52] U.S. Cl. ...................................... 237/46; 454/306; 165/1; 165/54
[58] Field of Search ............. 165/54, 1; 237/46, 50, 237/53, 55; 98/37, 42.01, 42.02, 31.6; 454/244, 241, 306

[56] References Cited

U.S. PATENT DOCUMENTS 1,176,536 3/1916 Fulton .
4,334,577 6/1982 George ............................ 165/54

OTHER PUBLICATIONS

Doss "Enerchanger-Description for Process and Equipment Patent", pp. 3-9.

Primary Examiner—Henry A. Bennet
Attorney, Agent, or Firm—Hermann Ivester, Hill, Van Santen, Steadman & Simpson

[57] ABSTRACT

The present invention is directed to a method and apparatus for growing poultry or other domesitcated fowl in an indoor environment. In particular, it is directed to an apparatus for efficiently heating and ventilating a poultry house and a method for using the same. Central to the apparatus and method is a unique energy exchange unit which uses the thermal energy of the exhaust air drawn from the poultry house to pre-heat the incoming fresh air supplied to the poultry house.

37 Claims, 3 Drawing Sheets

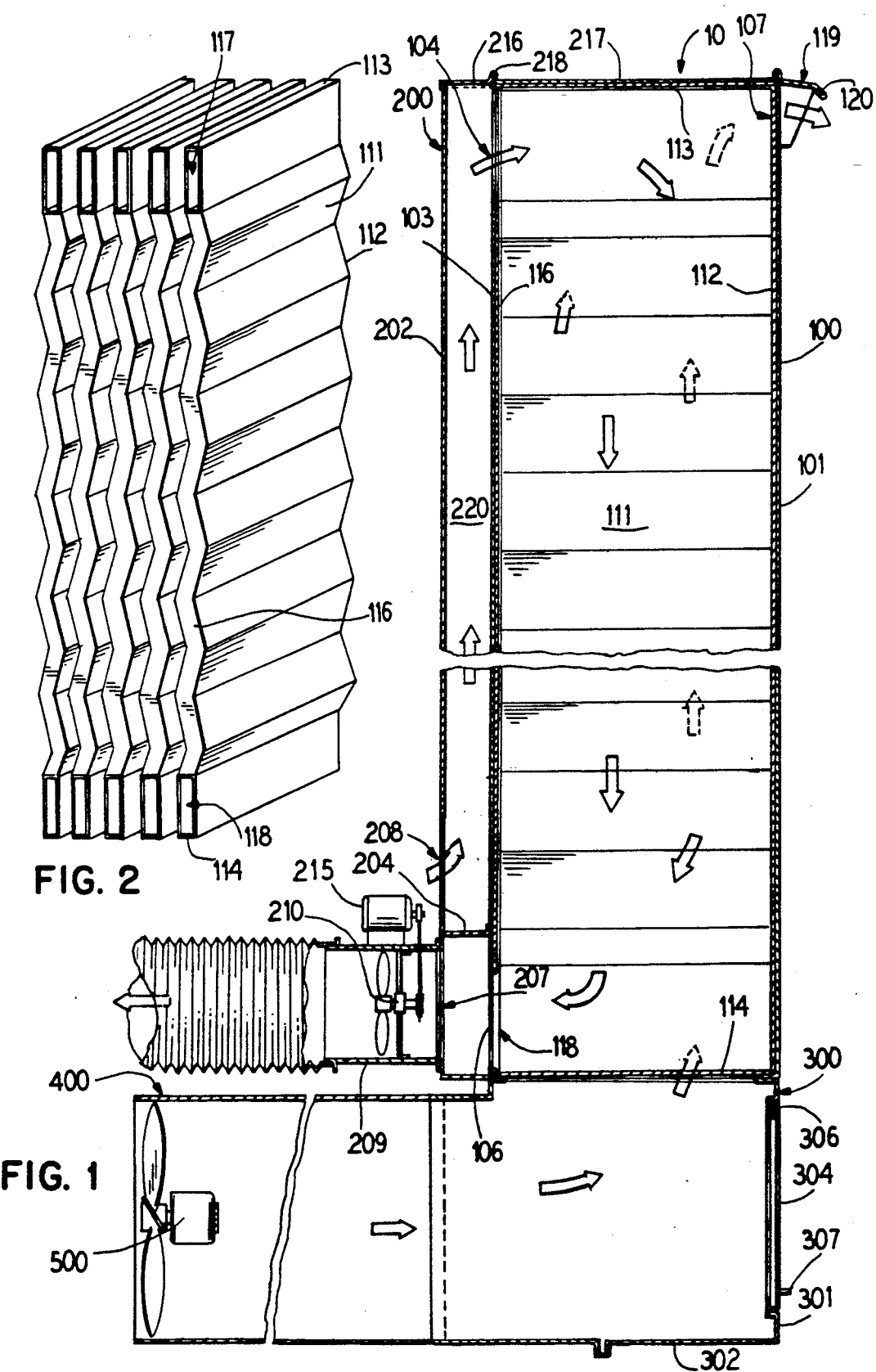

METHOD AND APPARATUS FOR HEATING AND VENTILATING A POULTRY HOUSE

BACKGROUND OF THE INVENTION

1. Field of the Invention

The present invention is directed to a method and apparatus for growing poultry in an indoor environment. In particular, it is directed to an apparatus for efficiently heating and ventilating a poultry house and a method for using the same.

2. Description of the Prior Art

In the poultry industry, as well as other industries where domesticated fowl are cared for in an indoor environment, the temperature and ventilation of the environment must be carefully managed. However, proper heating of the indoor environment may complicate the problems associated with its ventilation. Similarly, proper ventilation may induce improper heating. Therefore, it is necessary to strike a proper balance between the two.

Currently, the poultry industry utilizes a specified arrangement of brooder heaters, exhaust fans and curtains to facilitate the proper heating and ventilation of a poultry house. The brooder heaters are special heating units which provide the necessary heat for the poultry house and are sized according to the number of chickens the house can hold. At a minimum, one 30-40,000 BTU brooder heater should be utilized for every 750 chickens. These brooder heaters can be staggered down the center of the poultry house or, alternatively, staggered from side to side throughout the house. The brooder heaters use fully-on or fully-off type burners.

The exhaust fans of a typical poultry house are placed along the length of one of the poultry house walls. In most houses, the exhaust fans are mounted along the north wall. Due to the rigorous ventilation requirements, the exhaust fans employ 36" diameter blades.

The curtains of a typical poultry house are disposed along one side of the house opposite the exhaust fans as well as between the exhaust fans. Together, the curtains and exhaust fans provide the necessary cross-flow ventilation. At a minimum, four fans must be used with separate timers and overrides in houses greater than 350' in length. To provide the necessary ventilation while attempting to maintain heating efficiency, the exhaust fans are operated in a cyclic fashion. In most houses, the exhaust fans are on for a period of two minutes followed by an eight minute off period.

Many poultry houses are provided with a brooding section which is partitioned off from the rest of the house. Due to the added ventilation requirement of the chicks in such a brooding section, two fans are located therein.

Baby chicks, in particular, are extremely sensitive to temperature changes that occur within the poultry house. Any temperature changes prove to be extremely critical during the first three weeks of the six-week grow-out period (the time it takes for the baby chicken to grow to a sufficient size for processing). During the grow-out period, a 10° F. temperature deviation can stunt the growth of the chick and cause the chick to experience poor feed conversion (the ratio between the amount of food used to feed a chicken per pound of weight for the full grown chicken). Such a temperature deviation is often experienced by the chicks when they wander away from the brooders. Therefore, it is imperative to maintain the temperature throughout the poultry house at a constant level for the duration of the grow-out period.

There are certain known temperatures at which the chick will experience optimal growth and feed conversion. Specifically, during the first three weeks of the grow-out period, the poultry house, or brooding section thereof, should be maintained at a temperature that is no less 85° F. During the second three weeks of the grow-out period, this temperature level should be maintained at no less than 72° F.

Ventilation of the poultry house serves three main purposes. First, proper ventilation removes moisture from the house. Second, proper ventilation removes poisonous gases, such as ammonia and carbon dioxide, from the poultry house. The ammonia is generated by the baby chicks when their feces are mixed with the moisture laden make-up air and wood chips or rice hulls on the house floor. In an average poultry house, 300 pounds of chick manure is produced per 24 hour period thereby causing a high humidity environment which perpetuates the harmful effects of the ammonia gases and further promotes the growth of bacteria and fungi. Carbon dioxide is present in the poultry house as a result of normal respiration. Third, proper ventilation provides fresh breathable air for the chickens. Overall, the air in the poultry house must be exchanged at least four times per hour to supply the baby chicks with enough breathable fresh air to survive.

Feed expenses account for 60% of the cost of producing chickens. Therefore, a proper starting point for optimizing the chicken production process should focus on the feed and its associated variables (i.e., weight of the chickens and the feed conversion).

The proper heating and ventilation of the poultry house can have a significant effect on the weight and feed conversion of the chicken and, as a result, on the feed costs. When the temperature is too cold, the feed is consumed and converted to body heat rather than tissue for growth. The maximum feed conversion during the six week grow-out period is achieved at the 85° F. and 72° F. temperatures noted above. Thus, it must be recognized that there is a delicate balance which must occur between eliminating the moisture and gases from the poultry house, while at the same time providing the proper ventilation and warmth for the baby chickens.

As noted, the heating and ventilation of the poultry house influences the weight and feed conversion of the chickens. For instance, where the chickens are of good weight but experience poor feed conversion, the house is likely too cool thereby wasting feed from the feeders. Where the chickens are light in weight but are experiencing a good feed conversion, the house is likely too warm and the chicks are not receiving sufficient feed or water. If the chickens are light in weight and are further experiencing poor feed conversion, the poultry house ventilation is likely inadequate thereby causing a build up of ammonia.

The focus of the policies with respect to the heating and ventilation management of poultry houses has heretofore been primarily concerned with lowering fuel bills. This perspective loses site of the most important factor of the grow-out period —— chick comfort. By being overly concerned with energy savings, the chicks are exposed to an unstable environment of sudden temperature changes and improper ventilation thereby causing illness, and even death, among the chicks.

During cold weather operation, growers are often instructed to keep the curtains closed so that fresh air may be pulled through the cracks and crevices of the house when the exhaust fans turn on. This policy of keeping the curtains closed, in conjunction with the cyclic operation of the exhaust fans, causes two primary problems. First, cold air from the outside is immediately directed through the curtains to the floor when the exhaust fans turn on. Since the temperature of the poultry house is typically warmer than the cold outside air, the baby chicks experience a shock due to the sudden change in temperature. As a result of the influx of cold air, the brooder heaters turn on to elevate the poultry house to the proper temperature. However, at the same time that the brooder heaters are increasing the poultry house temperature, the ammonia and carbon dioxide gas as well as the humidity inside the house are also increasing.

Second, the cyclic exhaust fan operation and the closed curtains cause the poultry house to assume a negative air pressure with respect to the outdoor pressure. Consequently, there is an improper air flow which is generated throughout the house. Additionally, the cyclic operation of the exhaust fans submit the baby chicks to periods of stagnant, ammonia laden, high humidity conditions approximately 80% of the time.

Thus, it will be recognized that the poultry house environment is in a continuous cycle of change. When the poultry house temperature drops, the brooder heaters turn on. When the brooder heaters turn on, the humidity, ammonia, and carbon dioxide concentration levels increase. When those levels increase in this stagnant air condition, the exhaust fans turn on for 2 minutes and then off for 8 minutes. Nothing in the poultry house environment remains constant. The chickens are either too cold or too warm and they are either breathing fresh air for 2 minutes, or hot stagnant air for 8 minutes. This ever-changing environment brings illness and death to chickens throughout the entire poultry house.

SUMMARY OF THE INVENTION

An apparatus and an associated method for heating and ventilating a poultry house are set forth. The apparatus and method are used to efficiently maintain a constant temperature level within the poultry house and to further provide constant ventilation which exhausts poisonous gases from the environment while at the same time providing a continuous stream of fresh, pre-heated fresh air.

Central to the apparatus and method is a unique energy exchange unit which uses the thermal energy of the exhaust air drawn from the poultry house to pre-heat the incoming fresh air supply. The energy exchange unit has an exhaust air inlet transport which receives the exhaust air from the poultry house, an exhaust air outlet which releases the exhaust air to the outdoors, a fresh air inlet which receives the cool fresh air from the outdoors, and a fresh air outlet which supplies pre-heated fresh air to the poultry house.

Exhaust air from the poultry house enters the exhaust air inlet transport which communicates the exhaust air to a heat exchanger. Upon reaching the heat exchanger, the exhaust air enters the interstitial regions between a series of turbulation baffles. The interstitial regions between the turbulation baffles separate the exhaust air into discrete channels, the exhaust air proceeding therethrough being subsequently communicated to the exhaust air outlet. Propulsion of the exhaust air from the poultry house through the energy exchange unit can be accomplished by utilizing one of the exhaust fans already present in most poultry houses.

At the same time that the exhaust air is being transferred through the energy exchange unit, fresh air from the outside is also being communicated therethrough. The fresh air first enters the fresh air inlet and proceeds through a fresh air transport which is in communication with the heat exchanger. Upon reaching the heat exchanger, the fresh air is separated into discrete channels by the turbulation baffles. The turbulation baffles are arranged such that the fresh air and exhaust air pass through adjacent channels. However, the fresh air and exhaust air are not allowed to mix.

As the fresh air and exhaust air are passed through the discrete fresh air and exhaust air channels created by the turbulation baffles, thermal energy from the exhaust air (which has been heated by the brooder heaters inside the poultry house) is transferred to the incoming fresh air. As a result, the incoming fresh air is pre-heated before entering the poultry house. After passing through the energy exchange unit, the pre-heated fresh air is transferred to a fresh air exhaust chamber where it may be subsequently supplied to the poultry house. A fan is placed in the fresh air exhaust chamber to draw the fresh air through the energy exchange unit to the poultry house. Additionally, a further fan may be placed at the fresh air inlet to force the fresh air through the heat exchanger.

The pre-heated fresh air from the fresh air exhaust chamber may be supplied to an insulated duct which directs the pre-heated fresh air to a central portion of the ceiling region of the poultry house. At the ceiling region, the pre-heated fresh air is supplied to a T-shaped joint which connects the insulated duct to a non-insulated duct. The non-insulated duct proceeds along the length of the poultry house and has a series of discharge ports which dispense the pre-heated fresh air evenly throughout the poultry house. This configuration has an added advantage in that the thermal energy from the hot air located in the ceiling region can be used to further heat the pre-heated fresh air thereby improving the energy efficiency of the poultry house.

The energy exchange unit is provided with features which further enhance its operation dependent on the temperature of the outside air. When the temperature of the outside air exceeds the temperature desired on the inside of the poultry house, there is no need to pre-heat the incoming fresh air. Consequently, the exhaust air transport is designed such that it can direct the exhaust air either to the turbulation baffles of the heat exchanger or, alternatively, directly to a direction flow door which releases the exhaust air to the outside thereby preventing an exchange of thermal energy between the fresh air and exhaust air.

Similarly, there is a greater need to pre-heat the incoming fresh air when the temperature of the outside air is significantly below the temperature desired on the inside of the poultry house. To provide additional energy efficiency in such circumstances, the fresh air transport of the energy exchange unit includes a solar assist panel. Thus, solar power is used to pre-heat the fresh air even before it enters the channels of the heat exchanger where it is further heated by the exhaust air.

As a further feature, the energy exchange unit is operable in accordance with three different modes (cyclic, low volume continuous, and high volume continuous), each mode dependent on the particular requirements of the grower.

BRIEF DESCRIPTION OF THE DRAWINGS

Other objects, features and advantages of the invention will best be understood from the following detailed description taken in conjunction with the accompanying drawings, on which:

FIG. 1 is a cross-sectional side view of the energy exchange unit including arrows showing the flow of fresh air and exhaust air through the unit.

FIG. 2 shows a plurality of turbulation baffles in side-by-side relationship, as they would be arranged within the interior of the energy exchange unit.

DESCRIPTION OF THE PREFERRED EMBODIMENT

Figure 3:
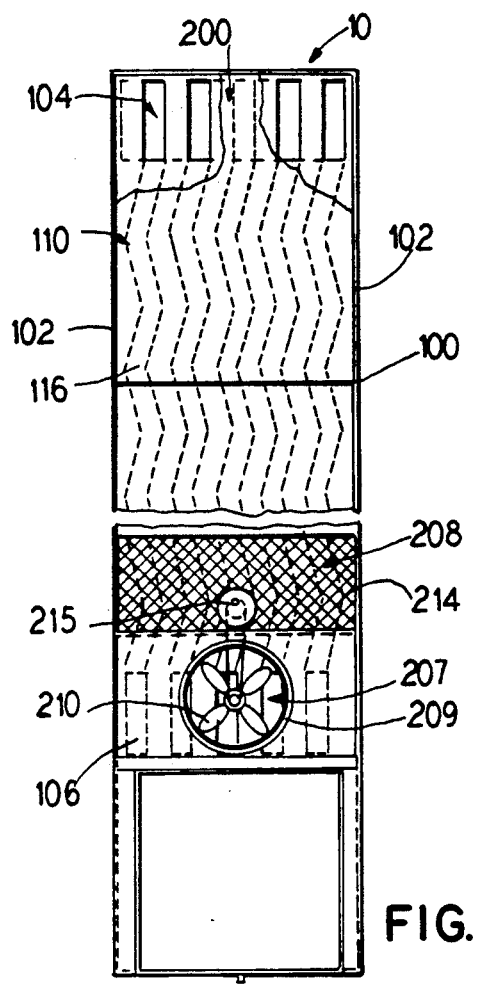
FIG. 3 is a rear plan view of the energy exchange unit showing a partial cutaway view through the piggyback section thereby exposing the first set of rectangular openings in the rear wall of the first rectangular unit.

Central to the apparatus and method of the present invention is an energy exchange unit 10. The energy exchange unit extracts thermal energy from the exhaust air as it passes from the poultry house through the energy exchange unit. The extracted thermal energy is then used to pre-heat incoming fresh air before the fresh air is subsequently supplied to the poultry house to replace the stale exhaust air.

An energy exchange unit 10 is shown in FIG. 1. Although there are many functional aspects of the energy exchange unit, it is useful to first consider the structure of the energy exchange unit primarily from the viewpoint of its construction.

As shown in FIG. 1, the energy exchange unit is constructed in a substantially L-shape. This substantially L-shaped structure can, for construction purposes, be divided into four sections: a first rectangular section 100, a piggyback section 200, a second rectangular section 300 and a third rectangular section 400.

The first rectangular section 100 comprises a front wall 101, side walls 102,102 and a rear wall 103. The rear wall 103 possesses a first set of rectangular openings 104 at its top portion and a second set of rectangular openings 106 at its bottom portion. Each of the openings of the first set of rectangular openings 104 on the rear wall 103 has a corresponding opening in the second set of rectangular openings 106 on the rear wall 103.

The front wall 101 has a series of rectangular exhaust openings 107 disposed through its top region opposite the first set of rectangular openings 104 disposed through the rear wall 103. Although the rectangular exhaust openings 107 on the front wall 101 and the first set of rectangular openings 104 on the rear wall 103 are located opposite one another, they are not in substantial alignment (i.e., none of the openings in the first set of rectangular openings is immediately across from a corresponding rectangular exhaust opening). Rather, it is the closed regions between each of the rectangular exhaust openings 107 in the front wall 101 which are located directly across from the openings of the first set of rectangular openings 104 on the rear wall 103, and vice versa.

A series of turbulation baffles 110 are disposed within the first rectangular section 100. These turbulation baffles 110 each respectively proceed from an opening in the first set of rectangular openings 104 to the corresponding opening in the second set of rectangular openings 106.

A series of turbulation baffles are shown in FIG. 2., each turbulation baffle 110 constructed having a meandering shape. Each turbulation baffle 110 is constructed to provide an arterial chamber through which air can pass, the chamber being defined by the side walls 111, a front wall 112 proceeding along the entire length of each turbulation baffle 110, top and bottom walls 113, 114 securing the ends of each turbulation baffle 110, and a rear wall 116.

The rear wall 116 of the turbulation baffle 110 is of limited length, thereby leaving openings 117, 118 respectively at the top and bottom portions of the rear of the turbulation baffle 110. The opening 117 at the top portion of the turbulation baffle 110 matches an opening of the first set of rectangular openings 104 in the rear wall 103 of the first rectangular section 100. Likewise, the opening 118 at the bottom portion of the turbulation baffle 110 matches a corresponding opening in the second set of rectangular openings 106. Thus, each turbulation baffle is associated with a single opening of the first set of rectangular openings and a corresponding single opening in the second set of rectangular openings thereby providing an artery through which air is communicated.

A service door 123 is disposed in the front wall 101 of the first rectangular section 100. This service door 123 is constructed having hinges 124 along one side thereof and a pair of handles 126,126 on its exterior face and is provided to allow ready access to the interior of the first rectangular section 100 during maintenance.

The piggyback section 200 comprises sidewalls 201, 201, a rear wall 202, an intermediate wall 203 and a bottom wall 204. The sidewalls 201, 201 and bottom wall 204 are connected to the rear wall 103 of the first rectangular section 100. Alternatively, the rear wall 202 may be formed as a solar assist panel.

The rear wall 202 of the piggyback section 200 has a circular aperture 207 and a rectangular opening 208 disposed therein which are vertically displaced from one another. The circular aperture 207 is located in substantial alignment with the second set of rectangular openings 106 in the rear wall 103 of the first rectangular section.

Proceeding from the circular aperture 207 is a cylindrical duct 209 wherein an axial drive fan 210 (fresh air fan) is disposed. The axial drive fan 210 is driven by a motor 215 and is directed to draw air from the energy exchange unit.

The rectangular opening 208 may be provided with a draft fan. Furthermore, bird screen 214 is provided to cover the rectangular opening 208.

The intermediate wall 203 is disposed horizontally between the rear wall 103 of the first rectangular section 100 and the rear wall 202 of the piggyback section 200. The intermediate wall 203 is displaced from the bottom wall 204 of the piggyback section so that it is located above the circular aperture 207 and the second set of rectangular openings 106 but below the rectangular opening 208.

Two separate top plates 216, 217 are used to seal the upper regions of the first rectangular section 100 and the piggyback section 200 respectively. A small deformation 218 is made in the top cover 217 of the piggyback section 200 to receive the rear wall 103 of the first rectangular section 100, since, as shown in FIG. 1, the rear wall 103 of the first rectangular section 100 is slightly longer than the rear wall 202 of the piggyback section 200. By accommodating the rear wall 103 of the first rectangular section 11 in this manner, an effective seal is made which isolates the first rectangular section 100 from the piggyback section 200.

A rain guard 119 is attached to the top of the front wall 101 of the first rectangular section 100. A lip 120 of the rain guard 119 overlaps the front wall 103 so as to shield the rectangular exhaust openings thereby preventing rain from entering the first rectangular section 100.

The second rectangular section 300 comprises a front wall 301, a bottom wall 302 and two side walls 303, 303. The rear of the second rectangular section as well as the top region thereof are open and do not have corresponding walls.

The top portion of the front wall 301 of the second rectangular section 300 is connected to the bottom portion of the front wall 101 of the first rectangular section 100. Likewise, the top portions of the sidewalls 303, 303 are connected to the lower portions of the sidewalls 102, 102 of the first rectangular section 100.

The front wall 301 of the second rectangular section 300 has a direction flow door 304 disposed therein. Hinges 306 are located at the top portion of the door 304 and a handle 307 is placed at the bottom thereof so that the direction flow door 304 may be easily opened in the upward direction.

The third rectangular section 400 merely acts as a duct which receives exhaust air from an exhaust fan 500 (typically a pre-existing type) in the poultry house 600 and communicates this exhaust air to the second rectangular section. Thus, there are no front or rear walls associated with the third rectangular section.

The energy exchange unit of the disclosed embodiment is constructed from galvanized sheet metal, the various sections being connected by metal rivets and screws. Since, as will be set forth below, it is necessary to isolate the exhaust air from the fresh air as it proceeds through the energy exchange unit 10, the interconnections between the various sections of the galvanized sheet metal should be of the type which restricts or prevents the flow of gas therethrough.

The operation of the energy exchange unit 10 can be more adequately understood if its structures are organized and described with respect to their function. Therefore, for the purposes of the following discussion, the structures of the energy exchange unit 10 will be organized and considered solely in view of their functional aspects as opposed to the specific construction which has already been discussed.

In this respect, the energy exchange unit may be divided into the following functional structures:
  a fresh air inlet transport;
  a fresh air outlet transport;
  an exhaust air inlet transport; and,
  a heat exchanger.

The arrows of FIG. 1 show the flow of fresh air and exhaust air through the energy exchange unit 10, the exhaust air being propelled through the unit 10 by the exhaust fan 500 while the fresh air is propelled therethrough by the axial drive fan 210.

Exhaust air is first pulled from the poultry house by the exhaust fan 500 and forced through the exhaust air inlet transport comprising the second and third rectangular sections 300, 400. From the exhaust air inlet transport, the exhaust air is directed to the heat exchanger comprising the first rectangular section 100 and the associated turbulation baffles 110.

Within the heat exchanger, the turbulation baffles 110, when placed in side-by-side arrangement, form discrete exhaust air channels 122 therebetween. When the exhaust air enters the heat exchanger, it proceeds through these discrete exhaust air channels 122 and contacts the sides of the turbulation baffles thereby transferring a portion of the thermal energy of the exhaust air to the galvanized metal (a good thermal conductor). After passing through the discrete exhaust air channels 122, the exhaust air then exits the heat exchanger, and the energy transfer unit, through the set of rectangular exhaust openings 107 disposed in the front wall 101 of the first rectangular section 100.

The fresh air inlet transport comprises the upper portion of the piggyback section 200 including the rectangular opening 208. The rectangular opening 211 allows a flow of fresh air from the outdoors into a fresh air chamber 220 defined by the upper portion of the piggyback section above the intermediate wall 203. As the fresh air passes through the fresh air chamber 220, it is pre-heated by the rear wall 203, formed as a solar assist panel.

Having passed through the fresh air chamber 220 of the fresh air inlet transport, the pre-heated fresh air proceeds through a heat exchanger comprising the first rectangular section 100 and the associated turbulation baffles 110.

Within the heat exchanger, the pre-heated fresh air from the fresh air chamber 220 first proceeds through the first set of rectangular openings 104 disposed in the rear wall 103 of the first rectangular section 100 and into the respective turbulation baffle 110. As the pre-heated fresh air contacts the sides of the turbulation baffles 110, it is further heated by the energy transferred through the turbulation baffles 110 (via the galvanized metal) from the exhaust air. The meandering shape of the turbulation baffles 110 enhances the efficient transfer of thermal energy between the exhaust air and the pre-heated fresh air conducted through the turbulation baffles. While in the heat exchanger, the configuration of the turbulation baffles 110, the first and second set of rectangular openings 104, 106, and the rectangular exhaust openings 107 prevents the intermixing of exhaust air and fresh air as they pass therethrough.

Figure 4:
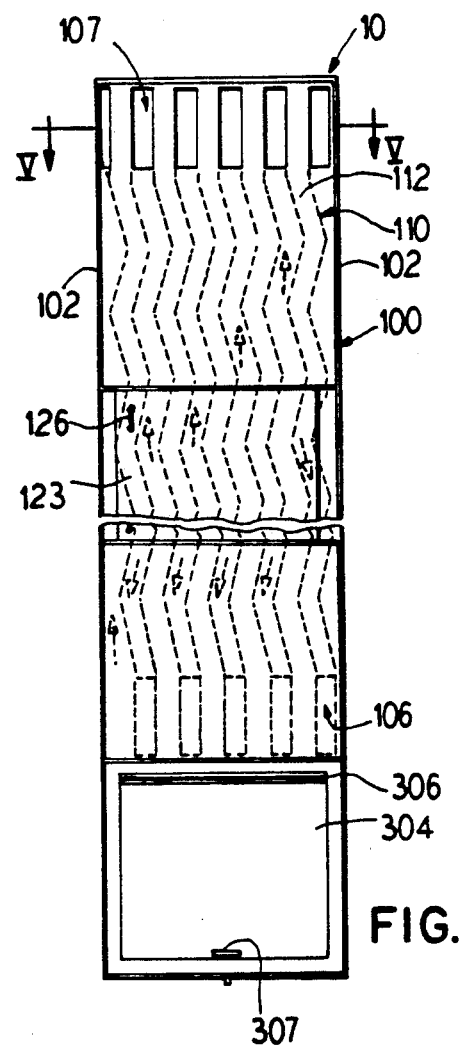
FIG. 4 is a front plan view of the energy exchange unit including arrows showing the flow of exhaust air (solid arrows) and fresh air (hollow arrows) as it proceeds through the heat exchanger.
Figure 5:
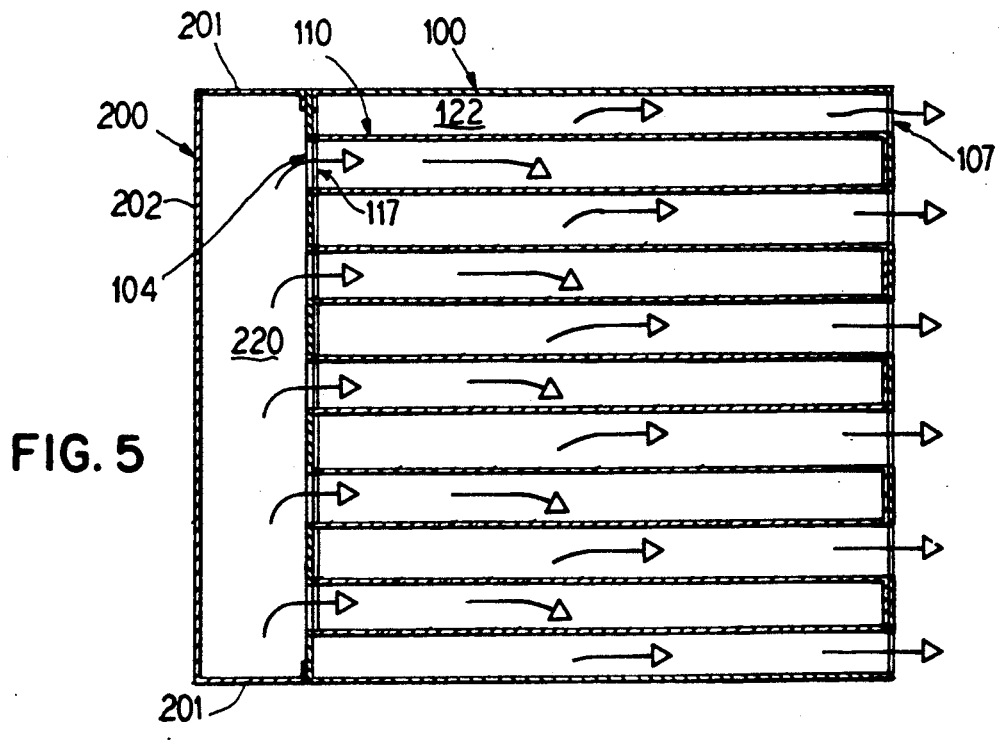
FIG. 5 is a cross-sectional view of FIG. 4 taken at line V—V further showing the flow of exhaust air (solid arrows) and fresh air (hollow arrows).

The flow of fresh air and exhaust air within the heat exchanger is exemplified in FIGS. 4 and 5, the solid arrows indicating the flow of exhaust air and the open arrows indicating the flow of fresh air. As shown in these figures, the fresh air is communicated through the turbulation baffles 110 while the exhaust air is communicated through the interstitial regions forming the discrete exhaust air channels 122 between the turbulation baffles.

Having been further pre-heated within the heat exchanger, the pre-heated fresh air proceeds to exit the heat exchanger through the second set of rectangular openings 106 disposed in the rear wall 103 of the first rectangular section 100. After passing through the second set of rectangular openings 106, the pre-heated fresh air is directed to a fresh air outlet transport comprising the lower region of the piggyback section 200 and the cylindrical duct 209. The air within the fresh air chamber 220 is prevented from mixing with the air within the fresh air outlet transport by the intermediate wall 203 of the piggyback section 200. It is the pre-heated fresh air that exits the fresh air outlet transport which is supplied to the poultry house 600.

Figure 6:
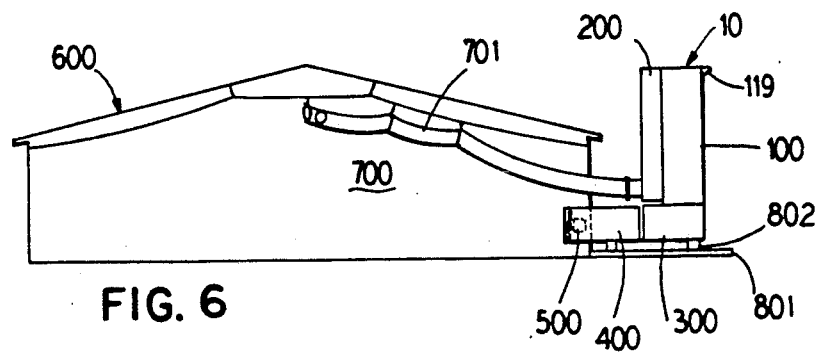
FIG. 6 shows the energy exchange unit and its relationship to the poultry house.
Figure 7:
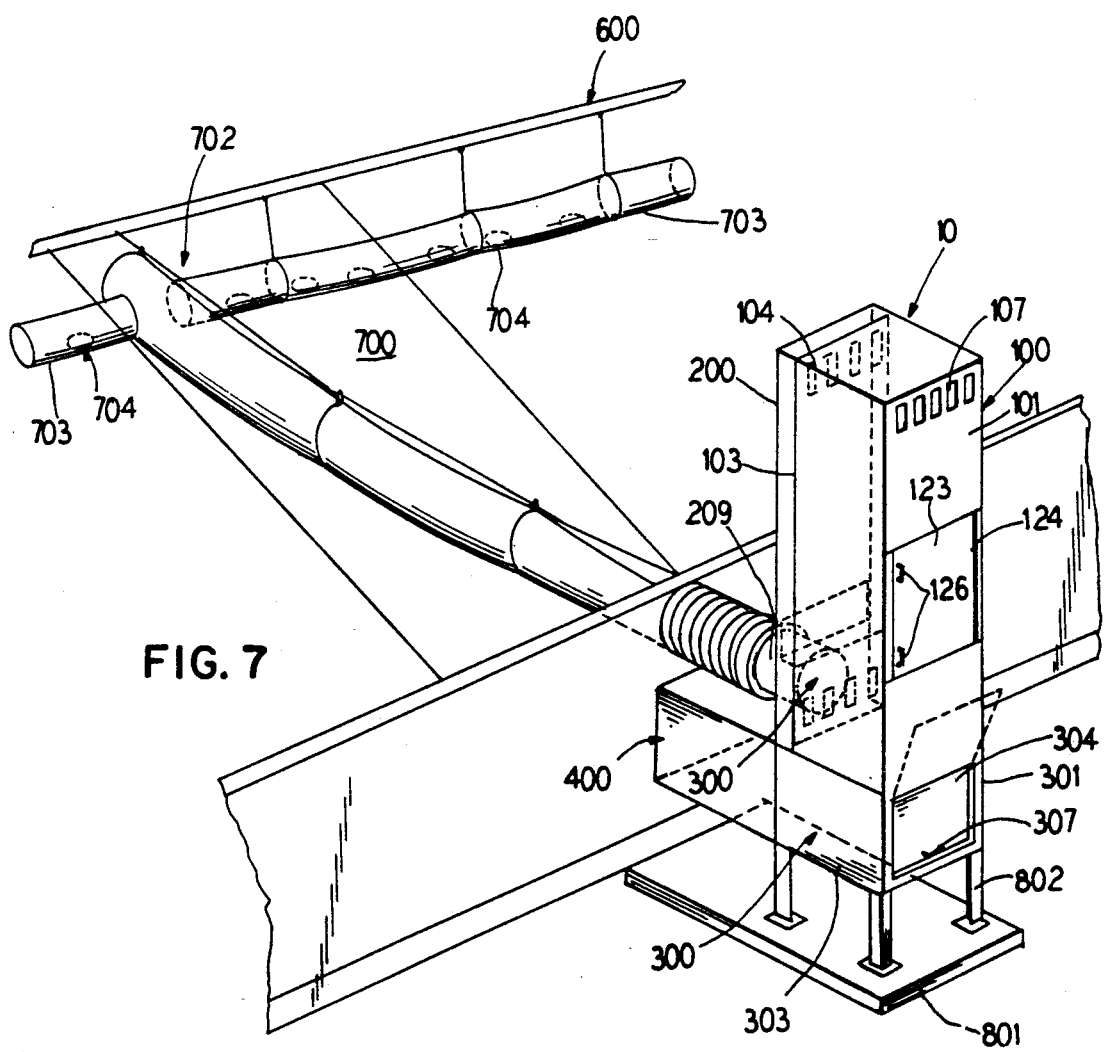
FIG. 7 is a perspective view showing the details of the energy exchange unit in relationship to the fresh air distribution system.

In the preferred embodiment, the pre-heated fresh air from the fresh air outlet transport is supplied to a fresh air distribution system, shown generally at 700 in FIGS. 6 and 7. Within the distribution system, the pre-heated fresh air proceeding from the cylindrical duct 209 is supplied to the input of an insulated duct 701. This insulated duct 701 extends to a central section of the ceiling region of the poultry house 600 where it is fastened in a T-shaped joint formation 702 with a pair of non-insulated ducts 703, 703.

Each of the non-insulated ducts 703, 703 extends along the length of the poultry house 600. Discharge ports 704 are evenly distributed along the non-insulated ducts 703, 703 to distribute the pre-heated fresh air.

Since the ducts 703, 703, are not insulated, they readily transfer thermal energy from the warm air at the ceiling region of the poultry house 600 to the air flowing through the interior of the ducts 703,703. Additionally, the turbulation caused by the flow of air exiting the discharge ports 704 increases the circulation of the warm ceiling air to the lower, and cooler, region of the poultry house. These factors assist in further conserving thermal energy.

In the preferred embodiment, both the insulated duct 701 and non-insulated duct 701 can be fabricated using a flexible duct material. Fresh air routing throughout the poultry house 600 can thus be simplified.

The energy exchange unit 10 is provided with features which enhance its operation dependent on the temperature of the outside air. When the temperature of the outside air exceeds the temperature desired on the inside the poultry house 600, there is no need to pre-heat the incoming fresh air. Consequently, the exhaust air transport is provided with a direction flow door 304 which can direct the exhaust air either to the turbulation baffles 110 of the heat exchanger when the direction flow door 304 is closed or, alternatively, directly through the open direction flow door 304 so as to release the exhaust air to the outside thereby preventing an exchange of thermal energy between the fresh air and exhaust air within the heat exchanger.

Similarly, there is a greater need to pre-heat the incoming fresh air when the temperature of the outside air is significantly below the temperature desired on the inside of the poultry house 600. The rear wall 203, when formed as a solar assist panel, provides additional energy efficiency in such circumstances. Thus, solar power is used to pre-heat the fresh air even before it enters the channels of the heat exchanger where it is further heated by the exhaust air.

FIGS. 6 and 7 show the inventive apparatus, including the energy exchange unit 10, in its operational environment. The energy exchange unit 10 can be conveniently mounted on a concrete slab 801. Furthermore, the energy exchange unit 10 can be provided with adjustable legs 802 which are used to adjust the height of the energy exchange unit 10 to further simplify installation.

The energy exchange unit 10 may be operated in accordance with three different modes (cyclic, low volume continuous, and high volume continuous), each mode dependent on the particular requirements of the grower. To be capable of operating in accordance with these modes, the exhaust fan 500 utilized must have a high volume speed (maximum volume speed) and a low volume speed (approximately 25% of the maximum volume speed). Similarly, the axial drive fan 210 utilized must have a high volume speed (maximum volume speed) and a low volume speed (approximately 25% of maximum volume speed).

The cyclic mode is utilized when the outside air temperature is above the desired internal temperature of the poultry house. In this mode, the directional flow door 304 is opened to allow the exhaust air to immediately proceed therethrough without being diverted into the heat exchanger. The exhaust fan 500 operates in the traditional cyclic mode in this instance.

The low volume continuous mode is typically invoked during the first three weeks of the six week chick grow-out period and, further, during the second three weeks of the chick grow-out period if more than one energy exchange unit 10 is utilized (obviously, this is dependent on the size of the poultry house). In this mode the exhaust fan 500 and the axial drive fan 210 operate continuously at their respective low volume speeds.

The high volume continuous mode is typically used during the final three weeks of the chick grow-out period if the poultry house 600 is only equipped with a single energy exchange unit 10. In this mode, the direction flow door 304 is closed and both the exhaust fan 500 and the axial drive fan 210 operate at their respective high volume speeds.

While the discussions with respect to this invention have been directed to its particular application with respect to poultry houses, it will be understood by those skilled in the art that the principles underlying this invention are generally applicable to the heating and ventilation of pig houses, livestock houses, etc. In essence, these principles apply to the domestic housing of any animal where it is desirable to maintain control over the environmental conditions within the house.

Although modifications and changes may be suggested by those skilled in the art, it is the intention of the inventor to embody within the patent warranted hereon any changes and modifications as reasonably and properly come within the scope of this contribution to the art.

I claim:

1. An apparatus for heating and ventilating a farm enclosure comprising:
    an energy exchange unit having,
        a fresh air inlet transport accepting fresh air from outside said farm enclosure;
        an exhaust air inlet transport accepting exhaust air from said enclosure, said exhaust air having thermal energy;
        a heat exchanger accepting said fresh air from said fresh air inlet transport and said exhaust air from said exhaust air inlet transport, said heat exchanger having turbulation baffles disposed therein, said turbulation baffles forming a first set of discrete channels for fresh air and a second set of discrete channels for said exhaust air, separating said exhaust air from said fresh air, said baffles arranged for exhaust air flow through said second set of discrete channels to be in a vertical direction, said turbulation baffles accepting a portion of said thermal energy from said exhaust air and transferring said portion of said thermal energy to said fresh air as said fresh air and exhaust air pass through said first and second set of discrete channels thereby to preheat said fresh air, said heat exchanger having an exhaust air outlet;

a fresh air outlet transport accepting said fresh air from said heat exchanger and communicating said fresh air to said enclosure;

a fresh air fan for propelling said fresh air into said fresh air inlet transport and through said heat exchanger and said fresh air outlet transport; and, an exhaust fan for propelling said exhaust air from said enclosure through said exhaust air inlet transport and said heat exchanger to said exhaust air outlet;

whereby said farm enclosure may be used to house poultry and livestock requiring carefully controlled environments.

2. An apparatus for heating and ventilating a farm enclosure comprising:
an energy exchange unit having,
a fresh air inlet transport accepting fresh air from outside said farm enclosure;
an exhaust air inlet transport accepting exhaust air from said farm enclosure, said exhaust air having thermal energy;
a heat exchanger accepting said fresh air from said fresh air inlet transport and said exhaust air from said exhaust air inlet transport, said heat exchanger having turbulation baffles disposed therein, said turbulation baffles forming discrete channels separating said exhaust air from said fresh air, said turbulation baffles accepting a portion of said thermal energy from said exhaust air and transferring said portion of said thermal energy to said fresh air as said fresh air and exhaust air pass through said discrete channels thereby to preheat said fresh air, said heat exchanger having an exhaust air outlet;
a fresh air outlet transport accepting said fresh air from said heat exchanger and communicating said fresh air to said farm enclosure;
a fresh air fan for propelling said fresh air into said fresh air inlet transport and through said heat exchanger and said fresh air outlet transport;
an exhaust fan for propelling said exhaust air from said farm enclosure through said exhaust air inlet transport and said heat exchanger to said exhaust air outlet, and
a fresh air distribution system having,
a delivery duct accepting said fresh air from said fresh air outlet transport and communicating said fresh air to a central ceiling region in said farm enclosure; and,
a non-insulated duct defined by a perimeter wall extending horizontally inside said enclosure, accepting said fresh air from said delivery duct at said central ceiling region, said non-insulated duct fashioned to accept heat transfer through a thickness of said perimeter wall from said air residing in said ceiling region, said non-insulated duct having discharge ports for dispersing said fresh air to said farm enclosure.

3. An apparatus for heating and ventilating a farm enclosure as recited in claim 2, wherein said delivery duct and said non-insulated duct are connected in a T-shaped joint formation, said non-insulated duct proceeding from said central ceiling region to further ceiling regions within said farm enclosure.

4. An apparatus for heating and ventilating a farm enclosure comprising:
an energy exchange unit having,
a fresh air inlet transport accepting fresh air from outside said farm enclosure;
an exhaust air inlet transport accepting exhaust air from said enclosure, said exhaust air having thermal energy;
a heat exchanger accepting said fresh air from said fresh air inlet transport and said exhaust air from said exhaust air inlet transport, said heat exchanger having turbulation baffles disposed therein, wherein each of said turbulation baffles comprises a front wall, a rear wall, and two side walls connected to from a discrete meandering channel there, meandering along a direction of air progression through said meandering channel, said baffles separating said exhaust air from said fresh air, said turbulation baffles accepting a portion of said thermal energy from said exhaust air and transferring said portion of said thermal energy to said fresh air as said fresh air and exhaust air pass through said exchanger thereby to preheat said fresh air, said heat exchanger having an exhaust air outlet;
a fresh air outlet transport accepting said fresh air from said heat exchanger and communicating said fresh air to said farm enclosure;
a fresh air fan for propelling said fresh air into said fresh air inlet transport and through said heat exchanger and said fresh air outlet transport; and,
an exhaust fan for propelling said exhaust air from said farm enclosure through said exhaust air inlet transport and said heat exchanger to said exhaust air outlet.

5. An apparatus for heating and ventilating a farm enclosure as recited in claim 4, wherein said turbulation baffles are disposed in side by side relationship within said heat exchanger to form a plurality of further meandering channels therebetween.

6. An apparatus for heating and ventilating a farm enclosure as recited in claim 5, wherein said exhaust air transport communicates said exhaust air to said plurality of further meandering channels between said turbulation baffles.

7. An apparatus for heating and ventilating a farm enclosure as recited in claim 1, wherein said fresh air fan is disposed in said fresh air outlet transport to draw fresh air through said apparatus.

8. An apparatus for heating and ventilating a farm enclosure as recited in claim 1, wherein said exhaust air fan is disposed in said exhaust air inlet transport.

9. An apparatus for heating and ventilating a farm enclosure as recited in claim 1, further comprising a draft fan connected to said fresh air inlet transport.

10. An apparatus for heating and ventilating a farm enclosure comprising:
an energy exchange unit having, a fresh air inlet transport accepting fresh air from outside said farm enclosure;

an exhaust air inlet transport accepting exhaust air from said enclosure, said exhaust air having thermal energy;

a heat exchanger accepting said fresh air from said fresh air inlet transport and said exhaust air from said exhaust air inlet transport, said heat exchanger having turbulation baffles disposed therein, said turbulation baffles forming a first set of discrete channels for fresh air and a second set of discrete channels for said exhaust air, separating said exhaust air from said fresh air, said baffles arranged for exhaust air flow through said second set of discrete channels to be in a vertical direction, said turbulation baffles accepting a portion of said thermal energy from said exhaust air and transferring said portion of said thermal energy to said fresh air as said fresh air and exhaust air pass through said first and second set of discrete channels thereby to preheat said fresh air, said heat exchanger having an exhaust air outlet;

a fresh air outlet transport accepting said fresh air from said heat exchanger and communicating said fresh air to said enclosure;

a fresh air for propelling said fresh air into said fresh air inlet transport and through said heat exchanger and said fresh air outlet transport;

an exhaust fan for propelling said exhaust air from said enclosure through said exhaust air inlet transport and said heat exchanger to said exhaust air outlet; and, a direction flow door on said exhaust air inlet transport, said direction flow door directing said exhaust air to said heat exchanger when closed and outside of said apparatus when opened;

whereby said farm enclosure may be used to house poultry and livestock requiring carefully controlled environments.

11. An apparatus for heating and ventilating a poultry house comprising:

a first rectangular section having a front wall and a rear wall, said front wall having a plurality of exhaust openings therethrough, said rear wall having a first set of openings through a top portion thereof and a second set of openings in a bottom portion thereof;

turbulation baffles disposed in said first rectangular section, said turbulation baffles forming discrete channels between said first and second set of openings in said first rectangular section and forming further discrete channels between said turbulation baffles;

a piggyback section connected at said rear wall of said first rectangular section, said piggyback section having a rear wall, bottom wall, and an intermediate wall, said rear wall having a first opening in substantial alignment with said second set of openings in said first rectangular section and a second opening vertically displaced upward from said first opening, said intermediate wall proceeding between said rear wall of said first rectangular section and said rear wall of said piggyback section and displaced from said bottom wall above said first opening and said second set of openings in said first rectangular section and below said second opening thereby forming a fresh air chamber for communicating fresh air received through said second opening to said first set of openings in said rear wall of said first rectangular section;

a second rectangular section having a front wall and two side walls connected to said first rectangular section;

a third rectangular section connected between said poultry house and said second rectangular section for communicating exhaust air to said second rectangular section, said second rectangular section having an open region to said first rectangular section for communicating said exhaust air to said further discrete channels between said turbulation baffles; and, an outlet duct connected between said first opening in said piggyback section and said poultry house.

12. An apparatus for heating and ventilating a poultry house as recited in claim 11, further comprising a direction flow door disposed in said second rectangular section, said direction flow door causing said exhaust air to be conducted from said second rectangular section to said first rectangular section when said direction flow door is closed and causing said exhaust air to exit said apparatus through said direction flow door when said direction flow door is open.

13. An apparatus for heating and ventilating a poultry house as recited in claim 11, further comprising an insulated duct connected to said outlet duct, said insulated duct proceeding to a central ceiling region in said poultry house.

14. An apparatus for heating and ventilating a poultry house as recited in claim 13, further comprising a non-insulated duct having discharge ports, said non-insulated duct connected to said insulated duct and proceeding from said central ceiling region to other regions of said poultry house.

15. An apparatus for heating and ventilating a poultry house as recited in claim 11, further comprising a service door disposed in said first rectangular section.

16. A method for heating and ventilating a poultry house comprising the steps of:

providing an energy exchange unit having a passage for flow of exhaust air from said poultry house and a passage for flow of fresh air from outside, the two passages separated by a heat conducting wall;

accepting fresh air into said energy exchange unit;

accepting exhaust air from said poultry house into said energy exchange unit;

energy exchange unit;

extracting thermal energy from said exhaust air in said exhaust air to sad fresh air as said fresh air flows through said energy exchange unit thereby to preheat said fresh air; and supplying said fresh air from said energy exchange unit to said poultry house.

17. A method for heating and ventilating a poultry house as recited in claim 16, further comprising the steps of:

receiving said fresh air supplied from said energy exchange unit into a delivery duct;

directing said fresh air received into said delivery duct to a central ceiling region of said poultry house;

a central ceiling region of said poultry house;

receiving said fresh air from said delivery duct at said central ceiling region into a non-insulated duct, said non-insulated duct accepting heat transfer from said ceiling region through a wall defining said non-insulated duct; and, distributing said fresh air to said poultry house through discharge ports in said non-insulated duct.

18. A method for heating and ventilating a poultry house comprising the steps of:
accepting fresh air into an energy exchange unit;
accepting exhaust air from said poultry house into said energy exchange unit;
extracting thermal energy from said exhaust air in said energy exchange unit as said exhaust air flows through said energy exchange unit;
transferring a portion of said thermal energy extracted from said exhaust air to said fresh air as said fresh air flows through said energy exchange unit thereby to pre-heat said fresh air; and,
supplying said fresh air from said energy exchange unit to said poultry house; ascertaining the temperature of said fresh air accepted into said energy exchange unit;
opening a direction flow door in said energy exchange unit when said temperature of said fresh air exceeds a desired temperature within said poultry house, said opening of said direction flow door inhibiting said step of extracting thermal energy from said exhaust air in said energy exchange unit and said step of transferring a portion of said thermal energy extracted from said exhaust air to said fresh air by diverting said exhaust air therethrough.

19. A method for heating and ventilating a poultry house comprising the steps of:
accepting fresh air into an energy exchange unit;
accepting exhaust air from said poultry house into said energy exchange unit;
extracting thermal energy from said exhaust air in said energy exchange unit as said exhaust air flows through said energy exchange unit;
transferring a portion of said thermal energy extracted from said exhaust air to said fresh air as said fresh air flows through said energy exchange unit thereby to pre-heat said fresh air; and,
supplying said fresh air from said energy exchange unit to said poultry house;
operating an exhaust fan and fresh air fan continuously at a low volume speed during a first three week period of a six week chick grow-out period; and,
operating said exhaust fan and said fresh air fan at a high volume speed during a second three week period of said six week chick grow-out period.

20. An apparatus for heating and ventilating a poultry house comprising:
a first section having a plurality of exhaust openings therethrough, a first set of openings through a top portion thereof and a second set of openings in a bottom portion thereof;
turbulation baffles disposed in said first section, said turbulation baffles forming discrete channels between said first and second set of openings in said first section and forming further discrete channels between said turbulation baffles;
a piggyback section connected to said first section, said piggyback section having an intermediate wall, a first opening in substantial alignment with said second set of openings in said first section and a second opening vertically displaced upward from said first opening,
said intermediate wall separating said first opening and said second set of openings in said first section and from said second opening thereby forming a fresh air chamber for communicating fresh air received through said second opening to said first set of openings of said first section;
a second section connected to said first section; a third section connected between said poultry house and said
second section for communicating exhaust air to said second section, said second section having an open region to said first section for communicating said exhaust air to said further discrete channels between said turbulation baffles; and,
an outlet duct connected between said first opening in said piggyback section and said poultry house.

21. An apparatus for heating and ventilating a poultry house as recited in claim 20, further comprising a direction flow door disposed in said second section, said direction flow door causing said exhaust air to be conducted from said second section to said first section when said direction flow door is closed and causing said exhaust air to exit said apparatus through said direction flow door when said direction flow door is open.

22. An apparatus for heating and ventilating a poultry house as recited in claim 20, further comprising an insulated duct connected to said outlet duct, said insulated duct proceeding to a central ceiling region in said poultry house.

23. An apparatus for heating and ventilating a poultry house as recited in claim 22, further comprising a non-insulated duct having discharge ports, said non-insulated duct connected to said insulated duct and proceeding from said central ceiling region to other regions of said poultry house.

24. An apparatus for heating and ventilating a poultry house as recited in claim 20, further comprising a service door disposed in said first section.

25. An apparatus for heating and ventilating a farm enclosure comprising:
an energy exchange unit having,
a fresh air inlet transport accepting fresh air from outside said farm enclosure;
an exhaust air inlet transport accepting exhaust air from said enclosure, said exhaust air having thermal energy;
a heat exchanger accepting said fresh air from said fresh air inlet transport and said exhaust air from said exhaust air inlet transport, said heat exchanger having turbulation baffles disposed therein, said turbulation baffles forming a first set of discrete channels for fresh air and a second set of discrete channels for said exhaust air, separating said exhaust air from said fresh air, said baffles arranged for exhaust air from said flow through said second set of discrete channels to be in an upward vertical direction, said turbulation baffles accepting a portion of said thermal energy from said exhaust air and transferring said portion of said thermal energy to said fresh air as said fresh air and exhaust air pass through said first and second set of discrete channels thereby to preheat said fresh air, said heat exchanger having an exhaust air outlet;
a fresh air outlet transport accepting said fresh air from said heat exchanger and communicating said fresh air to said enclosure;

a fresh air fan for propelling said fresh air into said fresh air inlet transport and through said heat exchanger and said fresh air outlet transport; and, an exhaust fan for propelling said exhaust air from said enclosure through said exhaust air inlet transport and said heat exchanger to said exhaust air outlet;

whereby said farm enclosure may be used to house poultry and livestock requiring carefully controlled environments.

26. An apparatus for heating and ventilating a farm enclosure comprising:

an energy exchange unit having, a fresh air inlet transport accepting fresh air from outside said farm enclosure;

an exhaust air inlet transport accepting exhaust air from said enclosure, said exhaust air having thermal energy;

a heat exchanger accepting said fresh air from said fresh air inlet transport and said exhaust air from said exhaust air inlet transport, said heat exchanger having turbulation baffles disposed therein, wherein each of said turbulation baffles comprises a front wall, a rear wall, and two side walls connected to form a discrete meandering channel therein, meandering along a direction of air progression through said meandering channel, said baffles separating said exhaust air from said fresh air, said baffles arranged for exhaust air flow in an upward vertical direction, said turbulation baffles accepting a portion of said thermal energy from said exhaust air and transferring said portion of said thermal energy to said fresh air as said fresh air and exhaust air pass through said exchanger thereby to preheat said fresh air, said heat exchanger having an exhaust air outlet;

a fresh air outlet transport accepting said fresh air from said heat exchanger and communicating said fresh air to said farm enclosure;

a fresh air fan for propelling said fresh air into said fresh air inlet transport and through said heat exchanger and said fresh air outlet transport; and, an exhaust fan for propelling said exhaust air from said farm enclosure through said exhaust air inlet transport and said heat exchanger to said exhaust air outlet.

27. An apparatus for heating and ventilating a farm enclosure as recited in claim 4, wherein said fresh air fan is disposed in said fresh air outlet transport to draw fresh air through said apparatus.

28. An apparatus for heating and ventilating a farm enclosure as recited in claim 27, wherein said exhaust air fan is disposed in said exhaust air inlet transport.

29. An apparatus for heating and ventilating a farm enclosure comprising:

an energy exchange unit having, a fresh air inlet transport accepting fresh air from outside said farm enclosure;

an exhaust air inlet transport accepting exhaust air from said enclosure, said exhaust air having thermal energy;

a heat exchanger accepting said fresh air from said fresh air inlet transport and said exhaust air from said exhaust air inlet transport, said heat exchanger having turbulation baffles disposed therein, wherein each of said turbulation baffles comprises a front wall, a rear wall, and two side walls connected to form a discrete meandering channel therein, meandering along a direction of air progression through said meandering channel, said baffles separating said exhaust air from said fresh air, said turbulation baffles accepting a portion of said thermal energy from said exhaust air and transferring said portion of said thermal energy to said fresh air as said fresh air and exhaust air pass through said exchanger thereby to preheat said fresh air, said heat exchanger having an exhaust air outlet;

a fresh air outlet transport accepting said fresh air from said heat exchanger and communicating said fresh air to said farm enclosure;

a fresh air fan for propelling said fresh air into said fresh air inlet transport and through said heat exchanger and said fresh air outlet transport; and, an exhaust fan for propelling said exhaust air from said farm enclosure through said exhaust air inlet transport and said heat exchanger to said exhaust air outlet; and a direction flow door on said exhaust air inlet transport, said direction flow door directing said exhaust air to said heat exchanger when closed and outside of said apparatus when opened.

30. An apparatus for heating and ventilating a farm enclosure comprising:

an energy exchange unit having, a fresh air inlet transport accepting fresh air from outside said farm enclosure;

an exhaust air inlet transport accepting exhaust air from said enclosure, said exhaust air having thermal energy;

a heat exchanger accepting said fresh air from said fresh air inlet transport and said exhaust air from said exhaust air inlet transport, said heat exchanger having turbulation baffles disposed therein, wherein each of said turbulation baffles comprises a front wall, a rear wall, and two side walls connected to form a discrete meandering channel therein, meandering along a direction of air progression through said meandering channel, said baffles separating said exhaust air from said fresh air, said turbulation baffles accepting a portion of said thermal energy from said exhaust air and transferring said portion of said thermal energy to said fresh air as said fresh air and exhaust air pass through said exchanger thereby to preheat said fresh air, said heat exchanger having an exhaust air outlet;

said baffles arranged for exhaust air flow in an upward meandering vertical direction between at least two of said baffles;

a fresh air outlet transport accepting said fresh air from said heat exchanger and communicating said fresh air to said farm enclosure;

a fresh air fan for propelling said fresh air into said fresh air inlet transport and through said heat exchanger and said fresh air outlet transport; and, said fresh air fan is disposed in said fresh air outlet transport to draw fresh air through said apparatus;

an exhaust fan for propelling said exhaust air from said farm enclosure through said exhaust air inlet transport and said heat exchanger to said exhaust air outlet;

said exhaust air fan is disposed in said exhaust air inlet transport; and a direction flow door on said exhaust air inlet transport, said direction flow door directing said exhaust air to said heat exchanger when closed and outside of said apparatus when opened.

31. An apparatus for heating and ventilating a farm enclosure as recited in claim 2, wherein said non-insulated duct comprises a flexible supply and distribution duct having hanging means arranged therefrom to support the non-insulated duct from the ceiling of the livestock house.

32. An apparatus for heating and ventilating a farm enclosure comprising:

a first rectangular section having a front wall and a rear wall, said front wall having a plurality of exhaust openings therethrough, said rear wall having a first set of openings through a top portion thereof and a second set of openings in a bottom portion thereof;

turbulation baffles disposed in said first rectangular section, said turbulation baffles forming discrete channels between said first and second set of openings in said first rectangular section and forming further discrete channels between said turbulation baffles;

a piggyback section connected at said rear wall of said first rectangular section, said piggyback section having a rear wall, bottom wall, and an intermediate wall, said rear wall having a first opening in substantial alignment with said second set of openings in said first rectangular section and a second opening vertically displaced upward from said first opening, said intermediate wall proceeding between said rear wall of said first rectangular section and said rear wall of said piggyback section and displaced from said bottom wall above said first opening and said second set of openings in said first rectangular section and below said second opening thereby forming a fresh air chamber for communicating fresh air received through said second opening to said first set of openings in said rear wall of said first rectangular section;

a second rectangular section having a front wall and two side walls connected to said first rectangular section;

a third rectangular section connected between said farm enclosure and said second rectangular section for communicating exhaust air to said second triangular section, said second rectangular section having an open region to said first rectangular section for communicating said exhaust air to said further discrete channels between said turbulation baffles; and, an outlet duct connected between said first opening in said piggyback section and said farm enclosure.

33. An apparatus for heating and ventilating a farm enclosure as recited in claim 32, further comprising a direction flow door disposed in said second rectangular section, said direction flow door causing said exhaust air to be conducted from said second rectangular section to said first rectangular section when said direction flow door is closed and causing said exhaust air to exit said apparatus through said direction flow door when said direction flow door is open.

34. An apparatus for heating and ventilating a farm enclosure as recited in claim 32, further comprising a service door disposed in said first rectangular section.

35. An apparatus as recited in claim 1, wherein said turbulation baffles are fashioned for said exhaust air flow through said second set of discrete channels to be in a meandering direction, meandering in a direction along a direction of air progression through said second set of discrete channels.

36. An apparatus as recited in claim 35, wherein said meandering path comprises a sawtooth profile having repeated sharp changes in direction.

37. An apparatus as recited in claim 4, wherein said meandering path comprises a sawtooth profile having repeated sharp changes in direction.

* * * * *